(12) United States Patent
Ovnicek

(10) Patent No.: US 6,672,395 B1
(45) Date of Patent: Jan. 6, 2004

(54) EQUINE BALANCING HOOF APPLIANCE

(76) Inventor: Eugene D. Ovnicek, 506 Hwy. 115, Penrose, CO (US) 81240

( * ) Notice: Subject to any disclaimer, the term of this patent is extended or adjusted under 35 U.S.C. 154(b) by 0 days.

(21) Appl. No.: 10/234,679

(22) Filed: Sep. 4, 2002

(51) Int. Cl.$^7$ ................................................. A01L 7/02
(52) U.S. Cl. .......................................... 168/14; 168/28
(58) Field of Search ............................... 168/14, 26, 28

(56) References Cited

U.S. PATENT DOCUMENTS

| | | | | |
|---|---|---|---|---|
| 903,043 | A | * 11/1908 | Barber ......................... | 168/28 |
| 905,709 | A | * 12/1908 | Kiernan ....................... | 168/14 |
| RE16,104 | E | * 6/1925 | Heymoss, Jr. | |
| 2,191,834 | A | * 2/1940 | Slack .......................... | 168/28 |

* cited by examiner

*Primary Examiner*—Robert P. Swiatek
(74) *Attorney, Agent, or Firm*—Richard W. Hanes; Hanes & Schutz, P.C.

(57) ABSTRACT

An equine hoof appliance for horses, comprising a substantially flat pad having the general shape of the footprint of a horse's hoof and defining a curved toe portion and a substantially flat rear edge portion. The pad attaches to the ground-contacting surface of a horse's hoof and, on its opposite surface, mounts a horseshoe disposed around a ground contacting forwardly sloping and distally extending caudal projection on the pad. The caudal projection emulates and exaggerates the hoof frog and in so doing accomplishes two important objectives. The projection encourages heel first foot placement for maintenance of healthy phalanges alignment. Simultaneously the projection stimulates proprioceptive functions in the hoof to improve the horse's balance.

12 Claims, 6 Drawing Sheets

EQUINE BALANCING HOOF APPLIANCE

FIELD OF THE INVENTION

The present invention relates generally to a hoof appliance for horses.

BACKGROUND OF THE INVENTION

An unshod equine foot functions reasonably well in a domestic setting until the demands on the foot exceed its ability to respond to conditions. Horseshoes have been and continue to be a popular approach to remedy the problems created by bare feet and to render a horse useful for all of its intended purposes. Notwithstanding the long history of horseshoes and the ever-increasing body of farrier knowledge related to hoof preparation, horseshoe design and placement, lameness in modern horses is on the increase, and in some breeds and disciplines it has reached epidemic proportions. Undoubtedly, the increasing incidents of lameness have multiple causes, but a primary origin of the problem is the continuing failure of current farrier technology to provide hoof appliances that maintain distal phalanges alignment. It has also become clear from recent research that the traditional application of a horseshoe results in detrimental loss of contact of the hoof frog with the ground. This loss of contact becomes meaningful in light of recent equine foot biomechanics findings that have disclosed the heretofore unknown presence of proprioceptors in the frog buttress. A proprioceptor is one of a variety of sensory end organs in muscles, tendons, and joint capsules that provide mental perception, usually at a subconscious level, of the movements and position of a living being's body and especially its limbs, independent of its vision. The absence of substantial ground contact of the frog results in the horse's loss of the sense of balance provided by the contact of the proprioceptors in the frog with the ground.

Studies of the hooves of wild horses reveal the normal presence of a natural build up of non-sensitive frog material at the caudal portion of the frog buttress. This information, coupled with the finding of proprioceptors in the same anatomical area, suggests strongly that the build-up of material serves as a mechanism to assist the function of the proprioceptors in this region. Related biomechanics research attributes significant importance to the caudal frog build up in promoting heel first ground contact and the consequent maintenance of proper distal phalanges alignment.

Traditional horseshoes and prior art hoof pads have not only failed to take advantage of the findings of this recent research, their construction and usage is, in many ways, counterproductive. Accordingly, it is a specific object of the present invention to provide an equine hoof pad that encourages heel first ground contact in order to maintain healthy distal phalanges alignment. An equally important goal of the invention is to provide a hoof pad and horseshoe combination that eliminates the lost frog ground contact caused by the traditional application of horseshoes. An associated object of the invention is to elevate the response of the hoof proprioceptors in a horse. The realization of these objects and advantages also results in increased dissipation of hoof energy through the digital cushion and the lateral hoof cartilage by means of the frog's increased contact with the ground.

SUMMARY OF THE INVENTION

The present invention relates generally to a hoof appliance for horses and more particularly to a balancing pad that mounts a horseshoe around a ground contacting forwardly sloping caudal projection. The caudal projection emulates and exaggerates the hoof frog and in so doing accomplishes two important objectives. The projection encourages heel first foot placement for maintenance of healthy phalanges alignment, including the navicular bone. Simultaneously the projection stimulates proprioceptive functions in the hoof to improve balance.

The balancing pad is shaped similar to the footprint of a horse's hoof defining a curved toe portion and a substantially flat rear edge. The pad includes a flat upper hoof-contacting surface and a bottom horseshoe-mounting surface. Projecting from the bottom horseshoe mounting surface of the pad is an integral or attached pad protrusion having a sloping depth aspect that extends downwardly from the bottom horseshoe-mounting surface of the pad and a longitudinal aspect that extends from the pad's rear edge forwardly and bi-laterally of the longitudinal centerline of the pad, to an apex, or other shaped forward edge, disposed generally in the center portion of the pad. The depth aspect of the projection diminishes from the rear edge portion of the projection to the forward edge thereof.

The pad is adapted to receive on its bottom surface a horseshoe formed of a narrow planer plate of material that is shaped to fit a horse's hoof. Typically, the horseshoe has a curved toe portion and two rearwardly extending branch members terminating in first and second heels, each heel having a thickness aspect that is perpendicular to the plane of the horseshoe. The horseshoe is attached to the pad and to the hoof by horseshoe nails through the bottom horseshoe-mounting surface of the pad and into the rim of the hoof or by adhesives. The horseshoe is positioned with the first and second horseshoe heels disposed forwardly of the rear edge of the pad. Preferably, the pad contains appropriate markers to indicate proper heel placement.

DETAILED DESCRIPTION OF THE INVENTION

Figure 1:
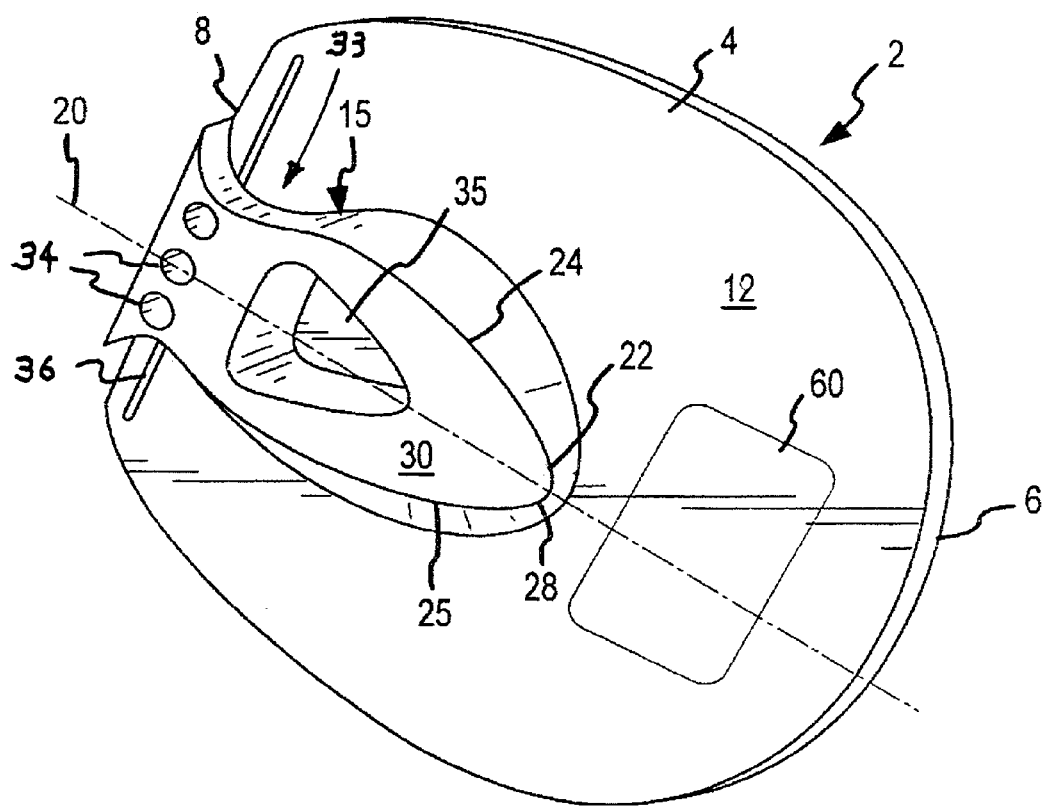
FIG. 1 is a perspective view of the hoof pad of the present invention showing primarily the bottom surface of the pad.

Hoof preparation and shoe placement that insures optimal orientation of the shoe around the coffin bone has been the primary goal of farriers for as long as horses have been wearing shoes. The art of farriery, however, is mostly based on long held past knowledge of the equine foot and how it has been perceived to function. Recent studies of the feet of self-maintaining wild horses and their hoof patterns have provided significant new knowledge on the subject and provide the basis for the apparatus of the present invention.

Maintaining caudal frog contact at the time of foot landing and through the loading portion of the stride, is necessary to dissipate energy and maintain alignment of the distal phalanges through the hoof's breakover maneuver. The discovery of proprioceptors in the caudal hoof frog confirms that better horse balance is achieved when the caudal frog comes into contact with the ground.

Studies of natural horse hoofs demonstrate the tendency for a build up of non-sensitive frog material at the most rearward portion of the frog buttress. This material extends forwardly to form a ledge on the ground-contacting surface of the rear portion of the frog. Natural progression of frog exfoliation permits the rear portion of the frog to maintain its existence longer than the central frog region. This closer study of the structure and the hoof frog coupled with the finding of proprioceptors in this same area clearly indicates that the natural caudal frog buildup serves as a mechanism to facilitate proprioceptor function. The caudal frog build up has also been found to be a significant biomechanic factor in maintaining optimal structural alignment of the distal phalanges.

This same frog mass routinely harbors dirt, specifically in the area of the bars behind the widest part of the foot and deep in the frog commissures. The natural bare foot that is maintained by the environment and lifestyle of the feral horse, as well as domestic horses that have access to a similar existence, have dirt compacted in their feet, specifically in the central caudal region, behind the widest part of the foot. The area forward of the widest part of the foot is normally void of debris because the hoof wall in the region is worn to the level of the sole. Domestic horses, however, frequently have a hoof wall that has grown beyond the sole level of the foot, allowing the complete solar aspect to collect and hold dirt. This complete filling can be helpful to the less active horse to supply the biomechanical needs of the hoof. However, traditional practice is to remove dirt and foreign matter that collects in the bottom of the foot for sanitation and bruising reasons, a practice that may be counterproductive in view of the new understanding of the multifunction of the caudal portion of the frog. It is thus apparent that support of the caudal frog, whether from natural dirt buildup or from other means is essential to the proper biomechanical function of a horse's hoof.

Some attempts have been made in the prior art to supply frog support by the use of pads by themselves or pads combined with compounds of a variety of materials. These devices, however, have not adequately addressed the biomechanical needs of distal phalange alignment and proprioceptor function that are satisfied by the device of the present invention.

Figure 2:
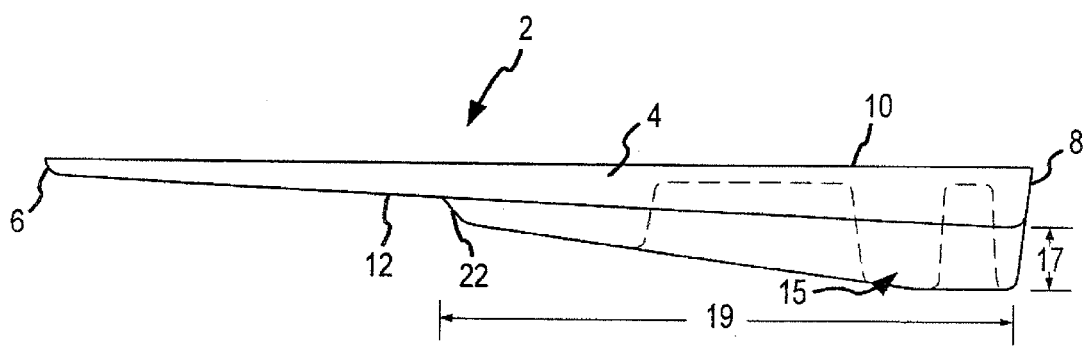
FIG. 2 is a side elevational view of the hoof pad of the present invention.

The hoof pad 2 of the present invention, as shown in FIGS. 1 and 2, can be constructed of plastic, rubber or metal. The plan view shape of the base 4 of the pad generally conforms to the footprint of a horse's hoof and in side elevation may be flat or tapered, either from back to front (FIG. 2) or from front to back, depending on balance issues that cannot be dealt with by hoof preparation. The pad comprises a curved toe portion 6, a substantially flat rear edge portion 8, a flat upper hoof-contacting surface 10 and a bottom horseshoe-mounting surface 12.

Extending downwardly from the bottom horseshoe-mounting surface 12 is an integral or attached pad projection, or nodule, 15 having a depth aspect 17. The longitudinal aspect 19 of the pad extends forwardly from the pad's rear edge 8 toward the toe portion 6. The projecting nodule extends bi-laterally of the longitudinal centerline 20 of the pad 2, the forward edge 22 of which is disposed in the center portion of the pad. The nodule acts primarily as a support mechanism to replicate the function of the live frog when shoes are used. The depth aspect 17 of the nodule 15 diminishes from the rear edge portion 8 to the forward edge thereof. Preferably, the projection 15 is shaped, in plan view, similar to an arrowhead with sides 24 and 25 diverging outwardly from the projection's centerline and then converging to an apex 28 that forms the forward edge. In the preferred embodiment the forward edge of the projection is pointed in the form of an apex to aid in the removal of dirt and debris from the front portion of the pad surface, however, this object can be attained with other shapes. A narrow waist portion 33 of the projection is provided to accommodate the heels of various shapes and sizes of horseshoes. The laterally converging portions of the sides 24 and 25 are beveled starting at the caudal edge of the depression 35 and slope from their line of contact with the pad base 12 toward the bottom ground contacting surface of the projection, to aid in removal of dirt and debris. These sloping sides define a narrower ground contacting surface 30 than the width of the projection 15 at its base, where the projection meets the bottom surface 12 of the pad 2. A central opening 35 and caudal openings 34 in the projection permit flexibility of the projection caudaly during a heel first landing. These openings also collect dirt, improving traction and accentuating the frog support function of the projection.

Figure 5:
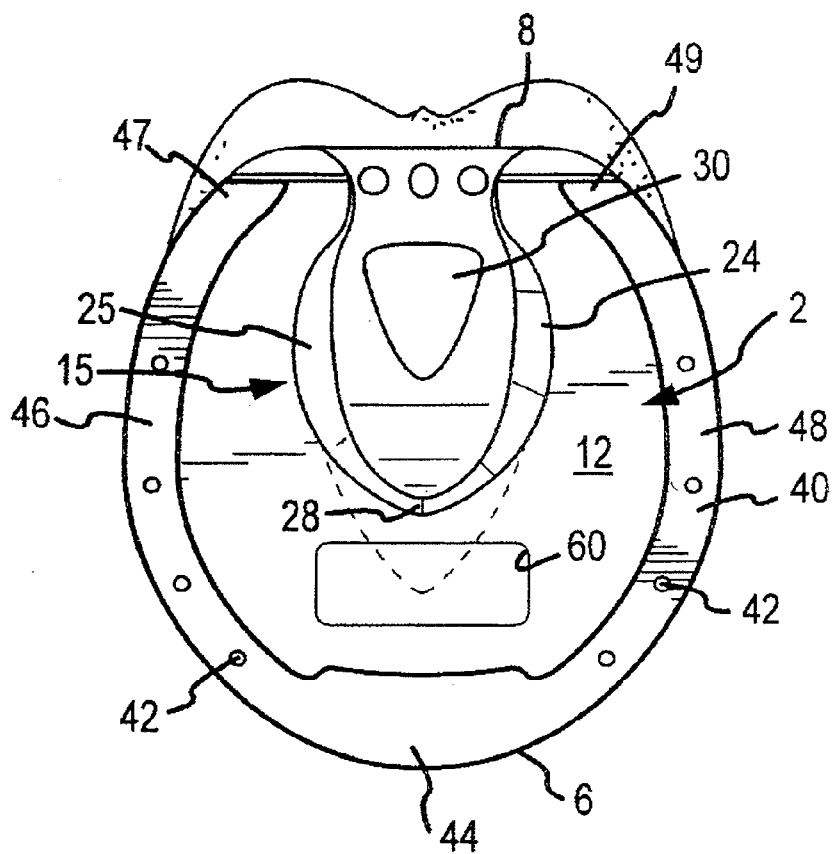
FIG. 5 is a bottom view of the hoof pad of the present invention with a horseshoe mounted on the pad and attached to a horse's hoof.

As seen in FIGS. 2 and 5, a horseshoe 40 is attached to the bottom horseshoe-mounting surface 12 of the pad 2 by any number of means, including conventional nails 42, adhesives or screwing into the rim of the hoof. The attaching means maintains the pad in its position on the lower surface of the hoof. The horseshoe of FIGS. 2 and 5 is conventional, comprising a narrow planer plate of a variety of materials, shaped to fit the horse's hoof. The horseshoe includes a curved toe portion 44 and two rearwardly extending branch members 46 and 48, terminating in first and second heels 47 and 49. Each heel has a thickness aspect perpendicular to the plane of the horseshoe.

Figure 6:
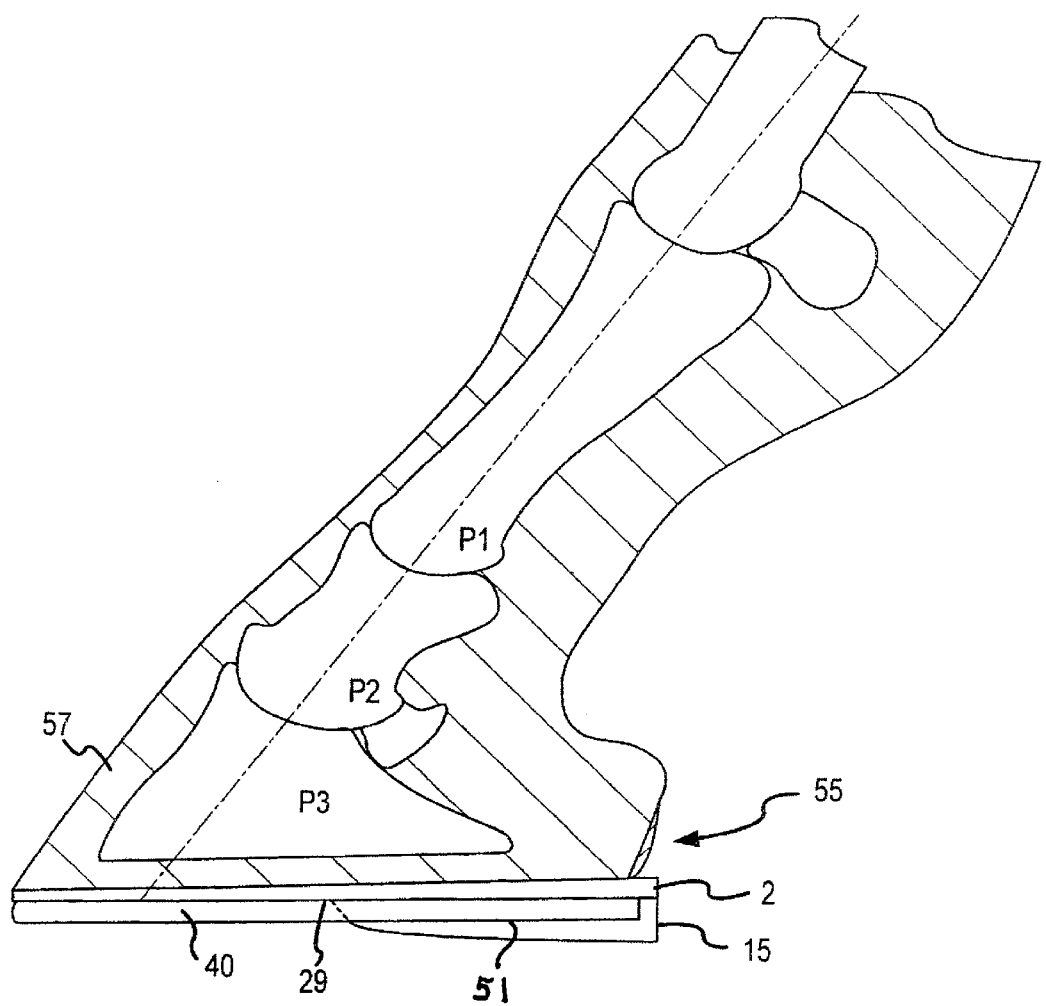
FIG. 6 is similar to FIG. 3 in illustrating the bone structure of a horse's hoof and lower leg and further includes a side elevational view of the pad of the present invention and a mounted horseshoe attached to the hoof.

Positioning of the horseshoe on the pad is important in achieving the advantages of the present invention. The horseshoe heels 47 and 49 are positioned forwardly of the rear edge 8 of the pad, as seen is FIG. 5. This configuration establishes vertical dominance of the caudal pad projection at the rear of the hoof and also rearwardly of the horseshoe heels. As seen in FIG. 6, the projection 15 extends below the lower ground-contacting surface 51 of the horseshoe. To insure that the horseshoe is not placed too far rearwardly of the pad, one or more index markers may be placed on the bottom surface 12 of the pad, such as the raised lines 36 in the preferred embodiment.

Figure 3:
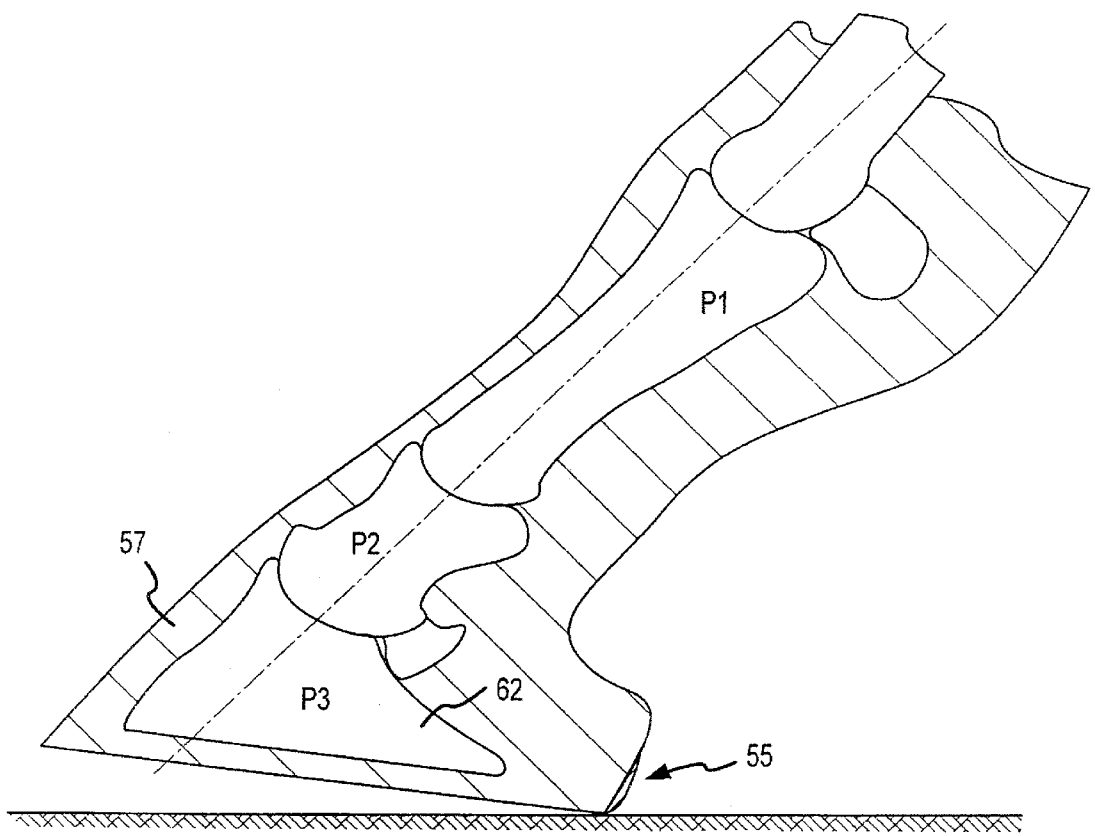
FIG. 3 is a side cut-away view of the bone structure of a horse's hoof and lower leg, emphasizing the normal alignment of the distal phalanges when the heel of the horse's hoof strikes the ground first when taking a step or a stride.
Figure 4:
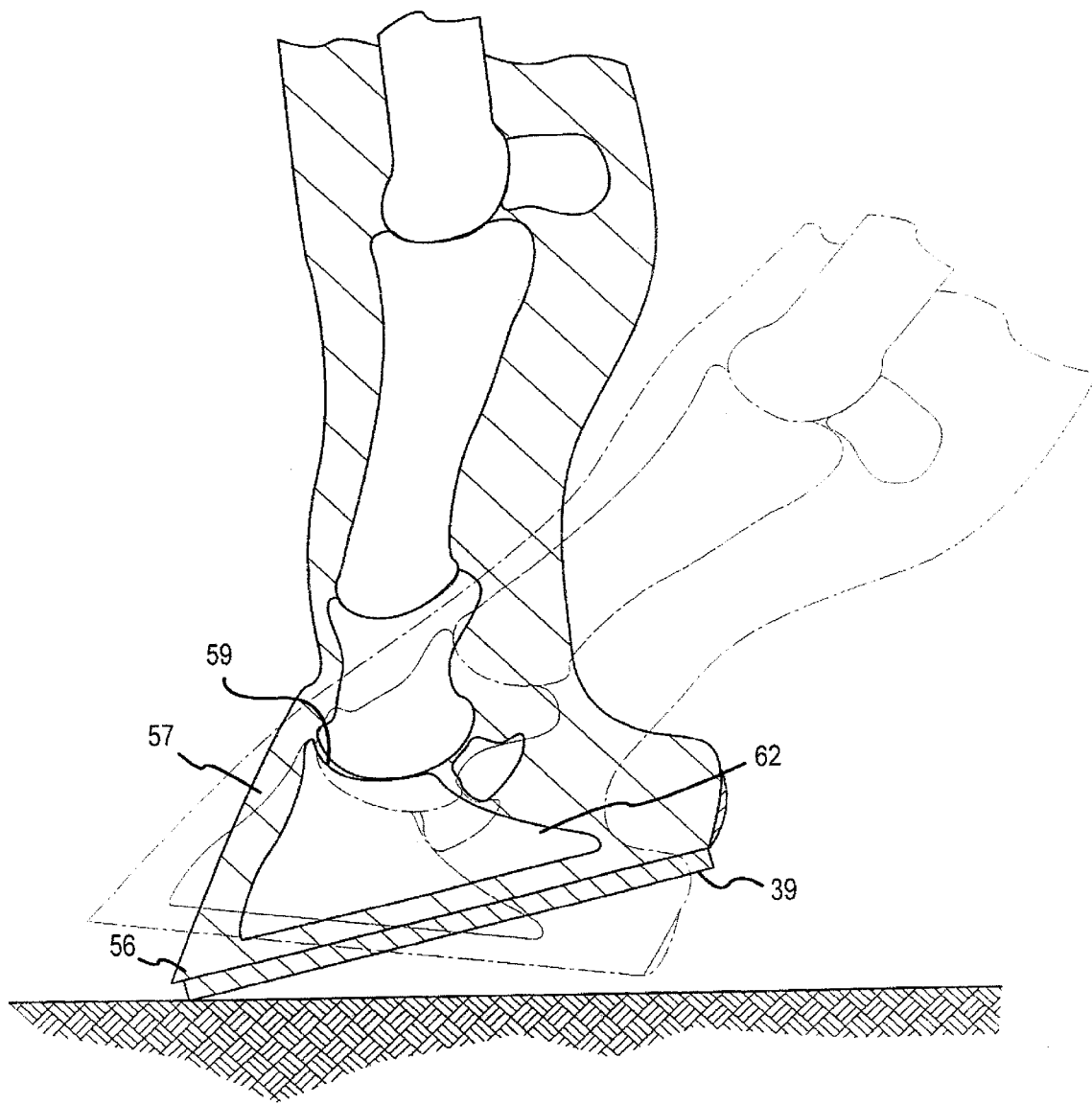
FIG. 4 is similar to FIG. 3 but emphasizes the misalignment of the distal phalanges when the toe of the horse's hoof strikes the ground first.

The vertical and longitudinal prominence of the nodule 15 projecting from the pad at the rear of the hoof plays an important part in promoting its heel first ground contact. As the hoof approaches the ground the prominent portion of the pad projection 15 tends to contact the ground before the toe 56 of the hoof makes ground contact. The advantage of this heel first contact is illustrated in FIGS. 3 and 4. FIG. 3 illustrates the alignment of the distal phalanges P1, P2 and P3 that is maintained when the heel 55 is the first portion of the hoof 57 to strike the ground. In unshod horses, as shown in FIG. 3, this is the natural placement. However, a hoof 57 having a horseshoe 39, as shown in FIG. 4, tends to produce misalignment of the distal phalanges because the toe 56 of the hoof is more apt to strike the ground first. The tendency for toe-first contact is exacerbated by the presence of a horseshoe and particularly with a shoe that is placed too far forward. Such placement delays the normal breakover in the forward movement of the horse's hoof causing a quickened effort by the horse to move the limb forward. A toe first landing is often the result. Although phalanges misalignment from a toe first landing is momentary, it causes subluxation and irritation of the coffin joint 59, resulting in potential lameness of the horse. The pad 2 of the present invention, with its prominent caudal and distal projection 15, significantly improves the probability of heel first contact and, even in the case of a toe first contact, the frog is supported sufficiently in the static state to extensively reduces the incidents of lameness resulting from repeated incidents of phalanges misalignment. The projection 15 dissipates energy and maintains blood flow to the hoof while simultaneously stimulating the proprioceptors with each foot fall, the natural response being to encourage a beneficial change in stride and improved balance.

To insure heel first contact and to continue that contact through the loaded phase of the stride while simultaneously achieving the multifunctional purpose of increased proprioceptive function of the caudal frog, it is important that the pad 2 be properly positioned on the hoof. Because the hoof wall that surrounds the coffin bone 62 can become distorted and provide a skewed image of the horseshoe, pad and coffin bone orientation it is preferable to position the pad and the shoe with reference to a fixed combination of structures in the hoof. Research has shown that the frog apex 28 and the widest part of the foot maintain a constant positional relationship to the coffin bone 62. Therefore, the apex of the frog provides a reliable reference point for the placement of the pad on the hoof. This reference point can be visualized through a transparent window 60 provided in the pad. In applying the pad, the apex of the frog is positioned in front of the forward edge of the pad's protrusion 15. Such placement allows not only for the heel first contact, but provides the support to the frog that enhances the function of its proprioceptors.

What is claimed is:

1. An appliance for an equine hoof comprising;
   a pad member having the general shape of the footprint of a horse's hoof and defining a curved toe portion and a substantially flat rear edge portion and having,
   lateral side edges,
   an upper hoof-contacting surface, and
   a bottom horseshoe-mounting surface means for application of
   a horseshoe having a pair of heels,
   a bilaterally centered nodule downwardly projecting from the bottom horseshoe-mounting surface of the pad, said nodule having a ground contacting surface, arch shaped sides with a forward apex, a diametrically disposed integral base and a narrowed waist portion to accommodate the heels of a horseshoe, the waist portion disposed intermediate the arch shaped sides and the base and where the nodule base overlies the flat rear edge portion of the pad.

2. The appliance of claim 1 and further including,
   a horseshoe comprising a narrow planar plate of material shaped to fit a horse's hoof and having a curved toe portion and two rearwardly extending branch members terminating in first and second heels, each heel having a thickness perpendicular to the plane of the horseshoe, said horseshoe attached to the bottom horseshoe-mounting surface means of the pad member with the first and second horseshoe heels disposed forwardly of the rear edge of the pad member.

3. The appliance of claim 2 where at least a portion of the nodule has a height aspect greater than the thickness of the first and second heels of the horseshoe.

4. The appliance of claim 2 where the first and second heels of the horseshoe are disposed in the respective spaces between the narrowed waist portion of the nodule and the lateral side edges of the pad.

5. The appliance of claim 1 where the arch shaped sides of the nodule slope inwardly from the horseshoe-mounting surface means of the pad toward the ground-contacting surface of the nodule.

6. The appliance of claim 1 where the nodule includes a cavity open to the ground-contacting surface of the nodule.

7. The appliance of claim 1 wherein the pad includes a transparent window disposed between the apex of the nodule and the curved toe portion of the pad.

8. The appliance of claim 1 where the nodule incorporates a height aspect bound by its ground contacting surface that is displaced from the bottom horseshoe-mounting surface of the pad and diminishes in extent from the nodule base to its apex.

9. An appliance for an equine hoof comprising:
   a pad member generally conforming in outline to a horse's hoof, including a curved toe and lateral sides and a substantially flat rear edge and having,
   an upper hoof-contacting surface and
   a bottom horseshoe-mounting surface,
   a wedge shaped nodule projecting from the bottom horseshoe-mounting surface of the pad, said nodule including lateral sides defining a variable width of the nodule where the lateral sides are spaced from the sides of the pad and further including,
   a nodule base having a width, wherein the width of the nodule base does not substantially exceed the width of any other portion of the nodule and wherein the nodule base overlies the flat rear edge of the pad.

10. The appliance of claim 9 and further including,
    a horseshoe attached to the horseshoe-mounting surface means of the pad and disposed in the respective spaces between the lateral sides of the nodule and the lateral sides of the pad.

11. The appliance of claim 10 where the horseshoe has a side profile thickness and where the nodule has a side profile height and where at least a portion of the side profile height of the nodule extends beyond the side profile thickness of the horseshoe.

12. The appliance of claim 9 where the nodule includes an apex spaced from the nodule base and where the pad includes a transparent window disposed between the apex of the nodule and the curved toe.

* * * * *